April 16, 1968
R. D. ANDERSON
3,378,268
PISTON RING ASSEMBLY
Filed Dec. 12, 1963
2 Sheets-Sheet 1
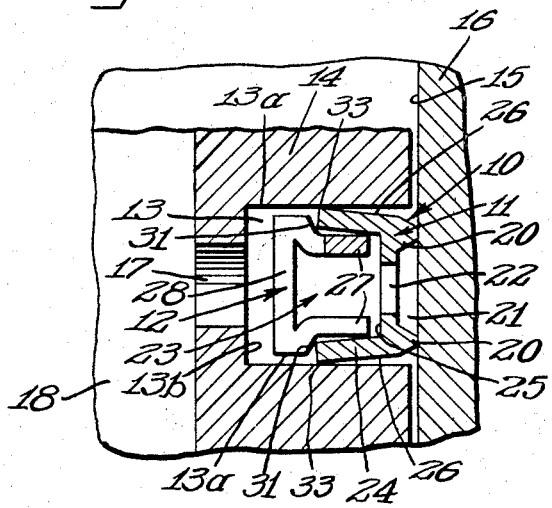
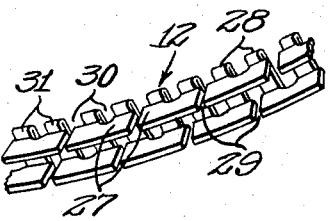
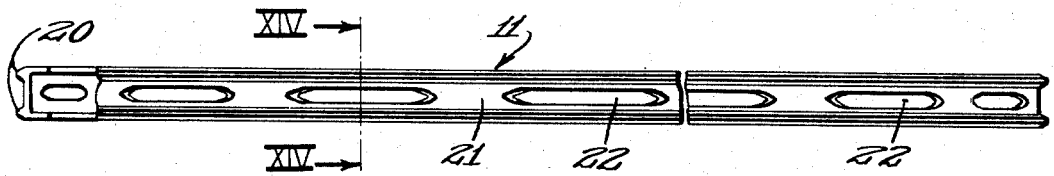
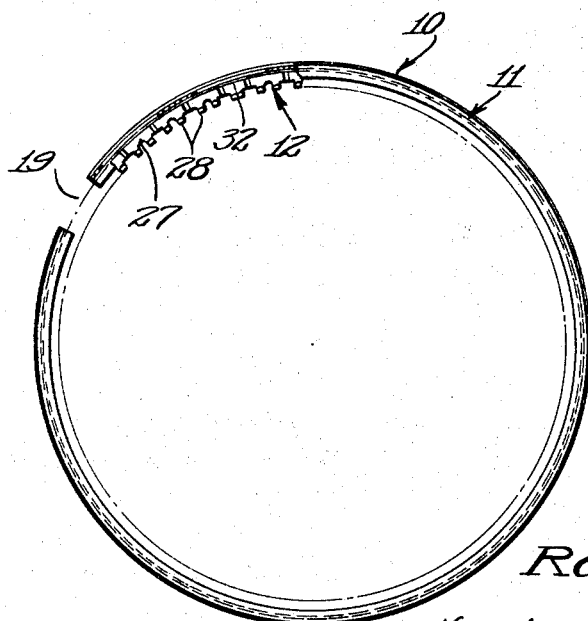
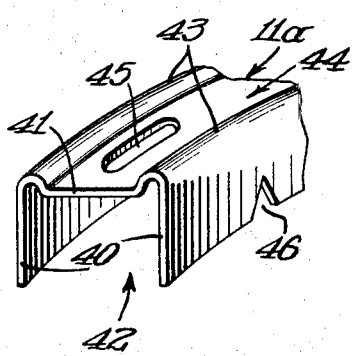
INVENTOR.
Roy D. Anderson
BY
ATTORNEYS April 16, 1968   R. D. ANDERSON   3,378,268
PISTON RING ASSEMBLY
Filed Dec. 12, 1963   2 Sheets-Sheet 2
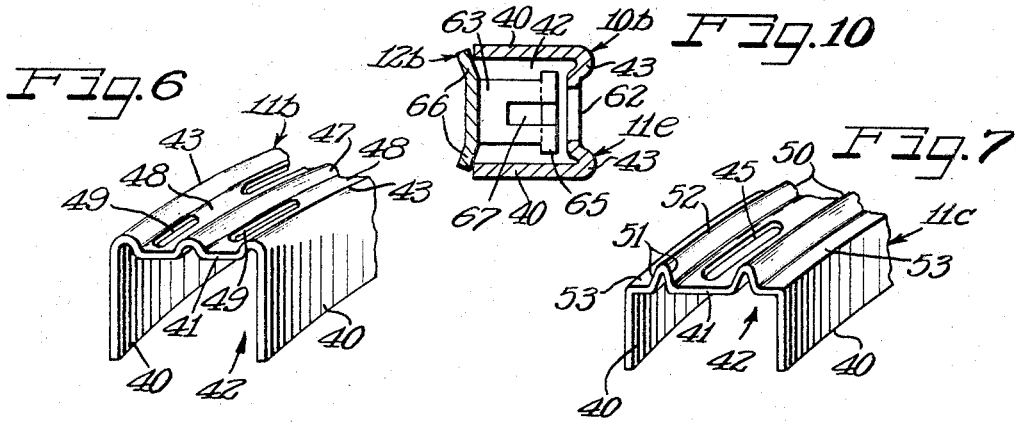
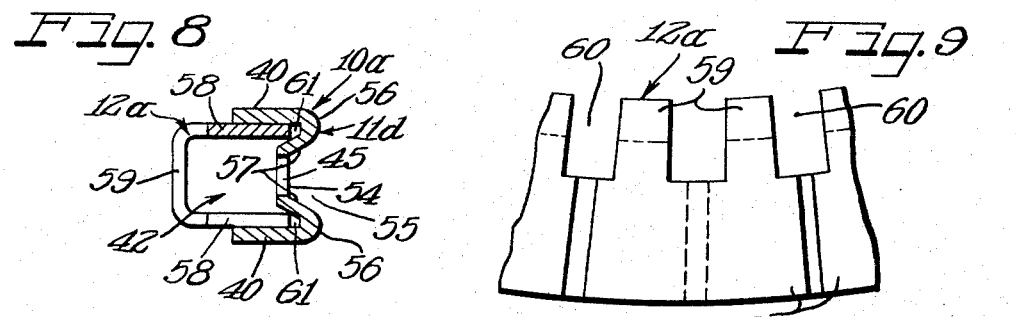
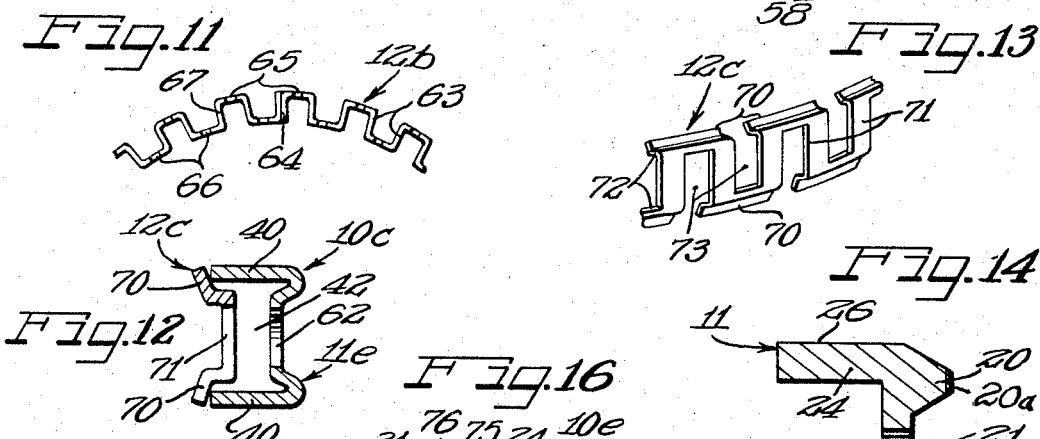
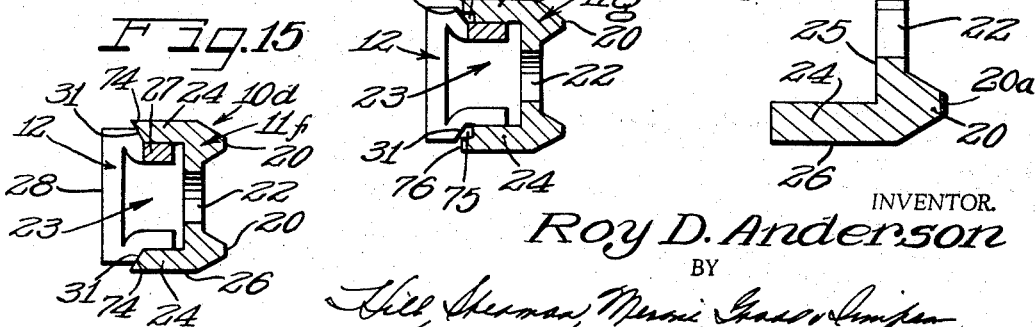
INVENTOR.
Roy D. Anderson
BY
ATTORNEYS

United States Patent Office 3,378,268
Patented Apr. 16, 1968

3,378,268
PISTON RING ASSEMBLY
Roy D. Anderson, Ballwin, Mo., assignor to Ramsey Corporation, St. Louis, Mo., a corporation of Ohio
Filed Dec. 12, 1963, Ser. No. 330,133
8 Claims. (Cl. 277—143)

This invention relates to a piston ring and expander assembly which promotes side sealing of a piston ring in a piston ring groove and more specifically relates to an oil control piston ring assembly composed of an outer snap oil ring and an inner circumferential type expander which urges the snap ring radially and axially outward for maintaining good sealing contact with a cylinder wall and with the side walls of the piston ring groove.

While the invention will hereinafter be specifically described as embodied in an oil control ring for internal combustion engine pistons, it will be understood that the principles of the invention are applicable to packing rings in general. Therefore the scope of the invention is not to be limited to the specifically described embodiments.

According to the present invention a one piece split snap type oil ring is provided with an inwardly opening channel around the entire inner periphery thereof. A circumferential type expander or garter spring ring is seated in this channel and acts both radially and axially against the oil ring to simultaneously load the oil ring against the cylinder wall and against the side walls of the piston ring groove. The channel equipped oil rings are shallow to have good radial flexibility for quickly conforming with the cylinder bore and are also axially flexible to be readily spread by the expander into sealing engagement with the side walls of the ring groove. The oil rings have axially spaced radially projecting rims or beads around the periphery thereof to provide the scraping edges for engaging the cylinder wall. A groove is provided between these rims or beads and passages join this groove with the channel to insure good oil drainage through the assembly. Since the snap ring is in one piece it cannot flip back and forth in operation and the paint brush effect of prior known rail ring and spacer expander assemblies is eliminated.

The oil ring of this invention can be composed of iron, steel, and non-ferrous metals and can either be plain, chrome plated, molybdenum coated, or otherwise covered with a hard facing material. The ring may be cast or rolled from metal strip stock.

The circumferential expander rings are formed of spring steel, have wide open areas for free drainage of oil, and are equipped with legs, lips or shoulders which induce axial spreading of the oil ring into side sealing contact with the ring groove. The expanders seat in the channel of the oil ring to form a unitary assembly which can easily be installed in engines with automatic machinery.

Desired side loading forces of the assembly can be varied by changing the tension of the circumferential expander, varying the angle of contact between the expander and the side walls or legs of the oil ring, varying the resiliency of the oil ring and varying the shape of the ring.

It is then an object of this invention to provide a highly flexible expander-piston ring assembly with side sealing capacity.

Another object of the invention is to provide a one piece channel shaped oil ring and circumferential expander ring assembly which simultaneously exerts radial and axial loads on the oil ring to maintain good sealing contact with a cylinder wall and with the side walls of the ring groove.

A still further object of this invention is to provide a two piece expander-snap oil ring assembly which promotes side sealing.

A further object of this invention is to provide a channel oil ring with flexible sides which are deformed into sealing engagement with the side walls of a piston ring groove by a circumferential expander.

Another object of the invention is to provide a free draining two piece oil ring assembly which does not bottom in an oil ring groove and which is urged into sealing engagement with the side walls of the groove.

Other and further objects of this invention will be apparent to those skilled in this art from the following detailed description of the annexed sheets of drawings which, by way of preferred example only, illustrate several embodiments of the invention.

On the drawings:

FIGURE 1 is a fragmentary vertical cross sectional view of a piston and cylinder assembly equipped with a side sealing oil ring assembly of this invention.

FIGURE 2 is a plan view of the oil ring assembly of FIG. 1 with parts broken away to show underlying parts and illustrating the assembly in its free expanded position.

FIGURE 3 is a fragmentary isometric view of the expander ring of the assembly of FIGS. 1 and 2.

FIGURE 4 is a side elevational view of the snap oil ring of the assembly of FIGS. 1 and 2 with a portion broken away to show an underlying portion.

FIGURE 5 is a fragmentary isometric view of an oil ring useful in the assemblies of this invention formed of strip metal.

FIGURE 6 is a view similar to FIG. 5 but showing another form of strip metal oil ring according to this invention.

FIGURE 7 is a view similar to FIGS. 5 and 6 but showing still a further form of the strip metal oil ring of this invention.

FIGURE 8 is a transverse cross sectional view of an oil ring-expander assembly of this invention embodying the oil ring of FIG. 5.

FIGURE 9 is a fragmentary plan view of the circumferential expander of the assembly of FIG. 8.

FIGURE 10 is a transverse cross sectional view of an oil ring-circumferential expander assembly embodying a further modified oil ring and a different type of circumferential expander.

FIGURE 11 is a fragmentary plan view of the expander in the assembly of FIG. 10.

FIGURE 12 is a vertical cross sectional view of still another assembly according to this invention.

FIGURE 13 is a fragmentary isometric view of the expander of the assembly of FIG. 12.

FIGURE 14 is an enlarged transverse cross sectional view of the oil ring of FIG. 4 along the line XIV—XIV of FIG. 4 and showing a hard facing coating on the ring.

FIGURE 15 is a cross sectional view of another oil ring assembly according to this invention.

FIGURE 16 is a view similar to FIG. 15 but showing a still further modification.

As shown on the drawings:

In FIGS. 1 and 2 the reference numeral 10 designates a piston ring assembly of this invention including a one piece cast iron snap oil ring 11 and a one piece spring steel circumferential expander ring 12. As shown in FIG. 1 the assembly 10 is mounted in the oil ring groove 13 of an internal combustion engine piston 14 operating in the bore 15 of an engine cylinder 16. The upper portion of the piston 14 is broken away at the oil ring groove level and, as shown, the groove 13 drains through holes such as 17 to the interior 18 of the piston.

The oil ring 11 is split and as shown in FIG. 2, in its free state, a gap 19 is provided between the split ends which gap of course is closed when the ring is compressed in the bore 15 of the engine cylinder. The ring 11 has a pair of axially spaced protruding peripheral beads or rims 20 therearound each providing a sharp scraping edge engaging the bore wall 15. An outwardly opening continuous outer peripheral groove 21 is provided between the beads or rims 20 and the rings have a plurality of closely spaced elongated slots 22 therethrough joining the bottom of the groove 21 with an inwardly facing peripheral channel 23.

As best shown in FIG. 14, in its free state the ring 11 is substantially U-shaped and the channel 23 is rectangular being provided with flat radial side walls or legs 24 and a straight axial back wall or bottom 25 pierced by the slots 22. The free state ring has flat top and bottom faces 26. The free axial height of the ring 11 is less than the axial height or width of the ring groove 13 so that the side walls 13a of the groove will freely receive the ring 11 therebetween.

If desired the beads or rims 20 of the ring 11 can be coated with a hard facing material 20a of molybdenum, chromium or the like. The radial depth of the ring 11 is materially less than the depth of the ring groove 13 so that the ring 11 will lie only in the outermost portion of the ring groove in widely spaced relation from the bottom 13b of the groove.

The expander 12 as best shown in FIG. 3 is composed of spring strip steel with top and bottom rows of circumferentially spaced arcuate flat segments 27 connected by circumferentially spaced upstanding fingers 28 around the inner periphery of the expander. These fingers connect the rows of segments in axially spaced relation with the segments in each row separated by gaps or slots 29 and with the slots of one row staggered with relation to the slots of the other row. Open spaces 30 are provided between the fingers 28. The segment 27 of one row is connected to an adjacent segment in the other row by a finger 28 and the fingers project axially beyond the segment to provide inclined lips or shoulders 31 between the upstanding fingers and the segment.

The ring 12 is split but when seated in the ring 11 the split ends of the ring are abutted together as shown at 32 to form a continuous annulus.

The axial height of the outer segment portions of the ring 12 is less than the axial height of the channel 23 of the oil ring 11 so that the segments fit freely between the legs 24 of the oil ring. The shoulders or lips 31 of the ring 12 however diverge axially outward and radially inward from the segments 27 to the ends of the upstanding fingers 28 and are of greater axial height than the channel 23 so as to engage the inner ends of the legs 24 for exerting a radially and axially outward expanding force thereon. The height of the legs 28 is less than the height of the groove 13 so as to permit a free or loose fit of the ring 12 in the groove 13.

As shown in FIG. 1 when the assembly 10 is compressed by the bore wall 15 in the groove 13, the expander 12 will load the ring 11 both radially and axially outward to hold the scraping edges 20 against the bore wall 15 and to tilt or dish the side legs 24 of the ring 11 into sealing contact with the side walls 13a of the ring groove. The inner ends of the normally flat faces 26 of the oil ring will have sealing contact with the side walls 13a as illustrated at 33. Since the shoulders 31 of the legs 28 are provided at closely spaced intervals around the entire circumference of the expander, the loading force on the oil ring transmitted from the expander through these shoulders or lips will be uniformly applied around the entire periphery of the oil ring. This expansion force being both radially outward and axially outward maintains peripheral as well as side wall sealing of the oil ring. The relative sealing loads can be varied by changing the angle of the lips or shoulders 31 to vary the force vector in the radial and axial directions.

It will be noted from FIG. 1 that the total radial depth of the assembly 10 is materially less than the depth of the ring groove 13 even when the assembly is pressed into operating position in the bore 15. The shallow radial depth of the assembly and especially of the oil ring 11 imparts great flexibility to the assembly adapting it to quickly conform with any bore irregularities. Further, since the overall height of the assembly in its free state is less than the height of the ring groove and since the side sealing is maintained by the expander, the ring will also quickly accommodate itself to any groove irregularities.

In operation of the assembly 10, oil scraped from the bore wall 15 by the scraping edges 20 drains into the peripheral groove 21 and thence through the slots 22 into the channel 23 from which it can easily drain through the open expander ring 12 into the holes 17 of the piston. Because the scraping edges provided by the beads 20 are integral parts of a single ring they can be made of any desired shape for efficient scraping action on the bore walls because they cannot flip back and forth in the manner of a paint brush as the piston is reciprocated.

If desired the oil ring of the assembly can be roll formed from strip metal and one form of such ring is shown at 11a in FIG. 5. The ring 11a is generally U-shaped in cross section with flat radial side legs 40 and an axial end wall or bight portion 41 defining an inwardly opening continuous channel 42. The end wall 41 is depressed inwardly between rounded peripheral beads 43 forming the scraping edges and the depressed portion between the beads 43 provides a continuous outwardly opening peripheral groove or channel 44. The wall 41 has slots 45 at intervals around the periphery thereof to freely join the outer peripheral groove 44 with the channel 42. Vent slots 46 are provided in the side legs 40 to further facilitate drainage.

A modified strip metal oil ring 11b is shown in FIG. 6 wherein portions identical with parts described in connection with FIG. 5 have been marked with the same reference numerals. In the embodiment 11b the outer depressed outer wall 41 has a raised bead 47 therearound midway between the beads or rims 43 to provide a third scraping edge. The ring 11b thus has two peripheral grooves 48, one on each side of the central rib 47, and each of these grooves drains through slots 49 in the end wall 4.

A still further modified oil ring 11c of the strip metal type is shown in FIG. 7 wherein parts identical with those described in FIG. 5 have been marked with the same reference numerals. As shown in FIG. 7 the end wall 41 has raised rims or beads 50 inwardly from the side legs 40. These beads are more peaked than the beads 43 of FIG. 5 having more acute sloping side walls 51 and narrower apices 52. Flat end wall portions or shoulders 53 are provided outwardly from the rims 50 on the end wall 41.

A spacer such as 12 described in connection with the assembly 10 can be used with each of the modified strip metal oil rings 11a, 11b and 11c of FIGS. 5 to 7.

In FIG. 8 a further modified oil ring assembly 10a is provided composed of a still further modified strip metal oil ring 11d and a different type of expander 12a. The oil ring 11d has parts identical with parts of the ring 11a in FIG. 5 marked with the same reference numerals but as shown the end wall 54 of the ring 11d is more depressed than the end wall 41 so as to provide a deeper peripheral groove 55. Further the scraping rims or beads 56 have elongated sloping inner sides 57 57 providing tapered shoulders or lips. The expander 12a of the assembly 10a, as best shown in FIG. 9, is a spring steel channel with top and bottom rows of circumferentially spaced segments 58 connected in staggered relation by vertical legs 59 around the inner periphery of the ring. The legs 59 are separated by relatively wide gaps 60. The legs 59 connect the adjoining top and bottom segments 58 in staggered relation and act as spring fingers to form a circumferential expansion type ring. The segments 58 have a sliding fit in the legs 40 of the ring 10b and project into the interiors of the beads 56 to act on the sloping walls 57 thereof. It will be noted from FIG. 8 that the recesses 61 provided around the periphery of the channel 42 by the beads 56 are wedge shaped or converging and that the peripheral edges of the segments 58 upon being urged into these converging recesses will exert an outward expanding force on the legs 40 causing the same to engage the side walls of the piston ring groove in sealing relation. A spreading action of the legs is thereby obtained and the sloping walls 57 act in the same manner as the lips or shoulders 31 of the expander 12 to create a force with an axial as well as a radial force vector.

A still further modified assembly 10b is illustrated in FIG. 10 wherein strip metal oil ring 11e coacts with a modified expander 12b. The ring 11e is quite similar to the ring 11a of FIG. 5 and identical portions have been marked with the same reference numerals. The ring 11e however has much wider slots 62 than the slots 45 of the ring 11a and is therefore somewhat more flexible in an axial direction. The expander 12b is better illustrated in FIG. 11 and is a radially corrugated ring of spring steel with alternately inwardly and outwardly opening radial corrugations of generally shape 63. Hhus each corrugation has radially outward extending legs connected at their outer ends by circumferentially spaced bight portions and at their inner ends by similar bight portions. The end legs 64 of the ring are abutted together to provide a continuous annulus when the ring is radially contracted. The outer bight portions of the corrugations have upstanding fingers or legs 65 thereon while the inner bight portions of the corrugations have longer legs or tabs 66 which are inclined radially inward and axially outward as best shown in FIG. 10. The corrugations 63 are slotted at 67 to increase oil flow drainage capacity of the ring. As shown in FIG. 10 the corrugations 63 fit freely in the channel 42 of the oil ring 11e and the upstanding legs 65 are spaced inwardly from the legs 40 of the ring. However the tab ends 66 abut the inner ends of the legs 40 and exert a radially outward and axially outward force against the legs thereby spreading the legs into sealing contact with the side walls of the ring groove while simultaneously urging the scraping edges 43 of the oil ring into good sealing contact with the bore wall.

In the modification 10c as shown in FIG. 12 the oil ring 11e of FIG. 10 is equipped with a further modified circumerential expander 12c better shown in FIG. 13. The expander 12c has top and bottom rows of circumferentially spaced axially upstanding segments 70 connected by spring fingers or legs 71 that are forwardly offset from the segments 70 by means of radially extending shoulders or ledges 72. The spring finger 71 at the end of one segment 70 in one row of segments is connected by a spring finger 71 to the adjacent segment 70 in the other row of segments to produce the circumferential expansion ring. Large drainage openings 73 are provided between the legs and segments.

As shown in FIG. 12 the upstanding segments 70 are inclined radially inward and axially outward and engage the inner ends of the legs 40 of the oil ring 11e to exert thereagaint an expansion force in a radially outward and axially outward direction in the same manner as described above in connection with the tabs 66 of the ring 12b. The connecting fingers 71 of the expander 12b do not extend into the channel 42 as deeply as the corrugations 63 but, like the corrugations 63 they are free of any contact with the oil ring 11e.

In the still further modification 10d as shown in FIG. 15 the expander 12 of the assembly 10 is used in combination with a slightly modified cast metal oil ring 11f. Portions of the ring 11f which are identical with those described in connection with the ring 11 have been marked with the same reference numerals. In the assembly 10d the inner ends of the oil ring legs 24 are beveled at 74 to slope radially outward and axially inward from the side faces 26 of the ring and confront the sloping or dished shoulders 31 of the expander 12. This of course increases the leg contact area with the expansion force transmitting shouders 31 of the expander ring for increasing the side loading of the legs 24.

In a still further embodiment 10e of FIG. 16 a cast metal oil ring 11g identical with the ring 11f except at the inner ends of the legs 24 receives the expander 12. As shown the inner ends of the legs 24 of the oil ring are grooved or notched at 75 to produce reduced thickness end portions 76 on the legs 24 outwardly from the channel 23. The inner corners of these reduced thickness portions 76 are engaged by the force transmitting shoulders 31 of the expander 12 so that the expanding force in an axial direction will be applied axially outward from the channel thereby varying the force vector.

Thus by varying the expander ring contacting ends of the oil ring legs, side loading force on the oil ring can be varied.

From the above descriptions it should therefore be understood that this invention provides side loaded oil ring combinations composed of only two components which are easily assembled and installed and which have excellent bore conformability and oil drainage capacity. The invention makes possible control of side loading forces by control of many variables such as changing the tension of the expander, varying the contact area of the oil ring with the side load force transmitting surfaces of the expander, varying the tab angle of the expander, changing the bending resistance of the channel shaped oil ring as by varying the thickness or length of the bight portion of the ring, changing the length of the legs of the oil ring and of course by changing the resiliency of the oil ring. Of course the oil ring can be cast or formed from strip stock and many different types of circumferential expanders can be used. If desired the cast or strip stock ferrous metal body of the oil ring can have at least the rims or beads thereof coated with hard facing materials including molybdenum, chromium, aluminum trioxide and the like to increase the hardness and wear resistance of the scraping edges.

Although various minor modifications might be suggested by those versed in the art, it should be understood that I wish to embody within the scope of the patent granted hereon all such embodiments as reasonably and properly come within the scope of my contribution to the art.

I claim as my invention:

1. A side sealing oil control piston ring assembly which comprises an outer one piece radially and axially flexible split metal ring having a peripheral groove therearound, an inwardly facing channel therein and passages therethrough connecting the groove and channel around the periphery of the ring, said channel having side legs adapted to be spread apart into sealing contact with the side walls of a ring groove, and an inner circumferential expansion ring seated in said channel and having means acting against and flexing said side legs of the channel of said outer ring for exerting radial and axial expansion forces thereagainst around substantially the entire periphery of the outer ring.

2. The piston ring assembly of claim 1 wherein the side legs of the channel have inner ends beveled toward the channel and the expansion ring has shoulders acting against said beveled ends to exert side sealing force thereagainst.

3. The piston ring assembly of claim 1 wherein the side legs of the channel have inner ends with notches therein providing reduced thickness portions, and said expansion ring has inclined shoulders acting against the notched inner ends of the side legs to exert a spreading action thereon.

4. The piston ring assembly of claim 1 wherein the outer ring is formed from strip metal bent into U-shaped cross-section with raised circumferential scraping edge forming beads embossed thereon on opposite sides of the peripheral groove.

5. The piston ring assembly of claim 1 wherein the outer ring has three raised circumeferential scraping edge forming beads therearound in axially spaced relation providing two peripheral grooves therebetween, and apertures connecting the grooves with the channel.

6. A side sealing oil control piston ring assembly which comprises a one-piece channel oil ring having side legs and an end wall coacting to provide an inwardly opening channel, wedge shaped grooves in the bottom of said channel between the end wall and side legs, and a circumferential expander having segments projecting through said channel into said grooves for exerting a radial expansion force in said channel grooves and against said side legs to simultaneously expand the ring radially outward and axially outward.

7. The piston ring assembly of claim 6 wherein the channel ring has radially projecting circumferential beads defining scraping edges with their outer surfaces and wedge-shaped recesses with their inner surfaces.

8. A two-piece radial and side sealing packing ring assembly for operation in a ring groove of a piston or the like which comprises a one-piece radially and axially flexible outer split metal ring having axially spaced peripheral beads therearound and a peripheral groove between said beads, said ring having an inwardly opening U-shaped channel around the inner periphery thereof with side legs adapted to be spread apart into sealing engagement with a ring groove receiving the assembly, said ring having passages therethrough connecting the outer peripheral groove thereof with the inwardly opening channel thereof, a one-piece circumferential expansion ring inside of said outer ring and extending at least partially into said channel of said outer ring, and force transmitting shoulders on said expansion ring acting against the inner ends of said side legs of the channel and effective to flex said outer ring to spread said side legs axially outward into side sealing engagement with the ring groove receiving the assembly as radial expanding force is applied by said expansion ring against the outer ring.

References Cited
UNITED STATES PATENTS

| | | | |
|---|---|---|---|
| 1,708,816 | 4/1929 | Williams | 277—160 X |
| 1,840,935 | 1/1932 | Curtis | 277—160 |
| 2,742,334 | 4/1956 | Phillips | 277—139 |
| 3,124,362 | 3/1964 | Davis | 277—24 |
| 3,191,946 | 6/1965 | Hamm | 277—138 |
| 3,202,430 | 8/1965 | Braendel | 277—144 X |
| 2,768,038 | 10/1956 | Cable | 277—140 |
| 2,804,361 | 8/1957 | Shirk | 277—140 |
| 2,817,563 | 12/1957 | Marien | 277—140 |

LAVERNE D. GEIGER, *Primary Examiner.*

J. MEDNICK, *Assistant Examiner.*